United States Patent [19]

Baugh

[11] Patent Number: 4,993,640
[45] Date of Patent: Feb. 19, 1991

[54] FLUID CONTROL SYSTEM

[76] Inventor: Mark R. Baugh, 5587 S. 3275 W., Salt Lake City, Utah 84118

[21] Appl. No.: 364,864

[22] Filed: Jun. 12, 1989

[51] Int. Cl.⁵ .............................................. A01G 25/16
[52] U.S. Cl. ........................................ 239/64; 239/70; 137/78.3
[58] Field of Search .................... 239/63, 64, 69, 70; 137/78.1, 78.2, 78.3, 624.11

[56] References Cited

U.S. PATENT DOCUMENTS

| | | | |
|---|---|---|---|
| 2,989,667 | 6/1961 | Swink | 239/63 |
| 4,114,647 | 9/1978 | Sturman et al. | 239/63 |
| 4,190,884 | 2/1980 | Medina | 239/63 |
| 4,304,989 | 12/1981 | Vos et al. | 239/63 |
| 4,333,490 | 6/1982 | Enter, Sr. | 239/64 |
| 4,396,149 | 8/1983 | Hirsch | 239/63 |
| 4,541,563 | 9/1985 | Uetsuhara | 239/64 |
| 4,548,225 | 10/1985 | Busalacchi | 239/64 |

Primary Examiner—Andres Kashnikow
Assistant Examiner—Karen B. Merritt
Attorney, Agent, or Firm—M. Ralph Shaffer

[57] ABSTRACT

A fluid control system for controlling one or more branches of a fluid delivery system, which can be manually controlled or, under general operating conditions, automatically controlled by ambient moisture conditions. When applied to sprinkler and irrigation systems, for example, the system will include a ground moisture sensor which, with associated means, can modify or adjust the preset watering times in accordance with soil needs as sensed by the sensor structure. The programmable timer is used for respective watering stations; the timers can be separately set to desired average watering time needed for particular stations. Sequencing functions and apparatus are also provided.

2 Claims, 2 Drawing Sheets

FLUID CONTROL SYSTEM

FIELD OF INVENTION

The present invention relates to fluid delivery systems and, particularly to water delivery systems such as sprinkler and irrigation systems. More particularly, the present invention provides an electronic system by which preset watering times can be automatically modified to adjust to ambient moisture conditions of the soil or other body being supplied the liquid.

BACKGROUND AND BRIEF DESCRIPTION OF PRIOR ART

While the invention can be applied and/or used in a variety of contexts, that is, for delivering fluid to a particular environment at preset, manually or automatically adjustable times in varying amounts, still the invention in the description set forth below will be directed to one of its principal uses, namely for supplying in a desired manner water to agricultural areas, irrigation systems, lawns, golf courses, and the like.

The system prevents a device which comprises an electronic system by which preset watering times can be automatically modified, if desired, to adjust for soil or plant needs. In a preferred embodiment of the invention, there is provided an electronic control box with one or more moisture sensors that will be placed in the ground. A programmable timer is used for each watering station. The timers employed can be separately set to the desired average watering time needed for the particular stations in question. An electronic clock is used, either internally or externally, to determine starting times for operation cycles.

The specific problem addressed, and one to which the prior art has not been particularly successful in addressing, is that of varying moisture-content cycle start conditions of areas to be treated such as, i.e., a golf course. Should the moisture content of such a course be relatively constant at start up times of the irrigation or sprinkler system, then there would be little problem in providing and timing a sprinkler system so that a given volume of water could be supplied over a given period and beginning at a specific time. The volume of water delivered, of course, will be determined by the length of time that a particular sprinkler branch is operating.

Problems arise, however, where initial start up moisture content conditions vary as, for example, at sprinkler times immediately after a rain storm, changes in moisture content owing to shady conditions and cloud patterns, rapid dry wind evaporation conditions, and so forth. What is desired, and what the present invention achieves, is an automatic system by which preset times for sprinkler operation can be automatically controlled or varied in accordance with ambient moisture conditions at the time of start up of each sprinkling cycle.

As to prior art the following U.S. patents have been noted:

U.S. Pat. No. 2,796,291, 3,024,372, 3,182,914, 3,238,392, 4,197,866, 4,216,789, 4,396,149, 4,684,920.

All of the above patents are relevant in connection with automatic or semi-automatic controls for sprinklers, including moisture-actuated controls.

The present invention differs from the above patents, both singly and taken in combination, in the following material respects: the present invention senses moisture content in the soil and uses this information to decrease or increase the preset water times according to the needs of the soil. Such decrease or increase in watering times will be in the form of a percentage added to or subtracted from each preset watering time. This approach makes it possible to use one ground moisture sensor to modify the watering times of many watering stations.

In the prior art as above recited, in contrast, there would be required a separate sensor for each watering station. Further, these would require water that is being applied to come in contact with the sensor to shut off the watering supply. The problems with such systems are as follows:

If the sensor is too close to the surface water being applied, then the same will shut off before enough water is delivered to reach lower root systems; if the sensor is deeper in the soil, then water being applied takes time to soak through the soil and reach the sensor. During this time an excess amount of water can accumulate on the surface, resulting in over-watering.

Also, prior art does not provide an automatic way in which additional moisture, i.e. moisture delivered longer than the preset time, can be added to the soil. This device also allows the user to set watering times for each station, and only modifies the time according to the needs of the soil in that particular area.

BRIEF DESCRIPTION OF INVENTION

An electronic device is provided by which preset watering times can be automatically modified to adjust for soil needs. Such automatic modification is effected through use of soil probes which sense moisture content for controlling, or offering an electronic controlled condition, to an electronic control box. Within the control box is a programmable timer for the respective watering stations. Each timer can be separately set to the desired average watering time needed for that particular station. A sequencer is provided and advances in order, through the preset times of each watering station. An electronic clock is employed, either internally or externally, to determine the starting times for the watering cycle. The details of operation are set forth in the detailed description of the invention which follows hereinafter.

As to results, normal dry soil will result in watering times equal to the preset times. Drier than normal soil will result in watering times longer than the preset watering times. Soil with a higher than normal moisture content will result in watering times less than the preset times. Provision is likewise made to allow for adjustment for different soil types and their respective electrical resistances under normal dry conditions.

OBJECTS

Accordingly, a principal object of the present invention is to provide a new and improved electronic system for automatically controlling water delivery systems in accordance with then sensed ambient conditions.

A further object of the invention is to provide an electronic system for accommodating a series of different watering stations, considering average soil moisture conditions.

An additional object is to provide an electronic system for water delivery purposes wherein preset times of operation thereof can be automatically adjusted in accordance with then present and sensed ambient moisture conditions present in the soil.

BRIEF DESCRIPTION OF DRAWINGS

The present invention, together with further objects and advantages thereof, may best be understood by a reference to the following detail description, taken in conjunction with the following drawings in which.

DETAILED DESCRIPTION OF PREFERRED EMBODIMENTS

Figure 1:
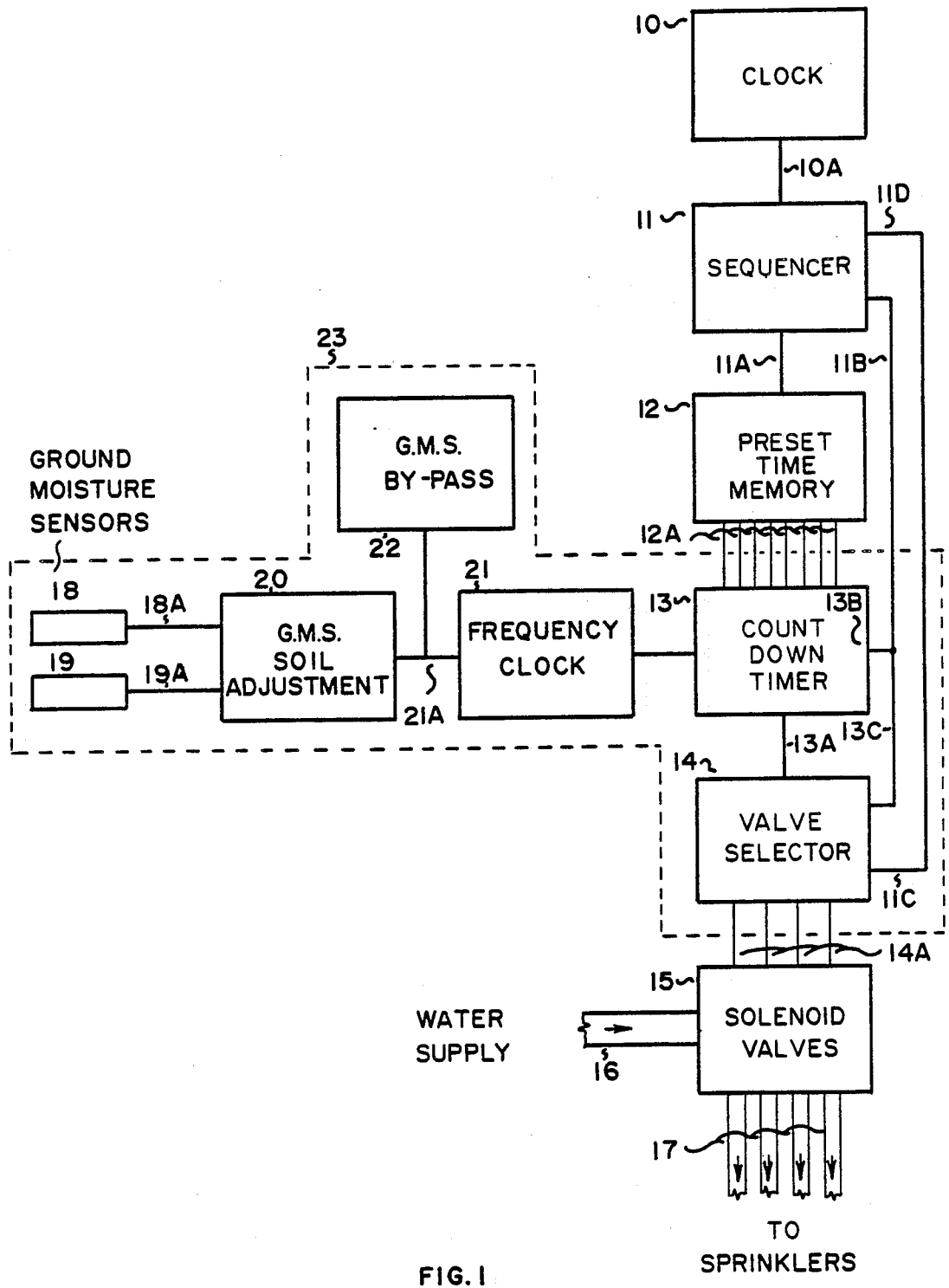
FIG. 1 is a schematic block diagram of the electronic system of the present invention.

In FIG. 1 clock 10 is connected by lead 10A to sequencer 11. In turn, sequencer 11 is connected by lead 11A to preset time memory 12. The electronic clock 10, sequencer 11, and preset time memory 12 are standard off-the-shelf components found in standard timer systems for home watering systems, for examples. The electronic clock 10 again, is common and may be either mechanical or electronic. The sequencer 11 are made by many different companies and are known in the industry simply by the numeral 7473 and 7400, by way of example. The preset time memory 12 is likewise an off-the-shelf item and is known in the art simply by the numeral 7489. Lead line 11B connects to an input of sequencer 11 and is coupled to the output sides of countdown timer 13 and valve selector 14 as illustrated. Lead 11C is coupled to the input of valve selector unit 14 back to the sequencer, as a feedback control to output side of the sequencer.

Preset time memory 12 has a series of output leads 12A which are respectively connected to different inputs of countdown timer 13. The output of countdown timer 13 is connected to valve selector 14 by lead 13A, and valve selector 14 has a series of outputs at 14A connecting to a like series of inputs for solenoid valves a unit 15. The water supply is provided at 16 and the solenoid valve or valves employed, valves being used for a series of stations, will be provided the water outputs at the series of branches shown at 17, the latter leading to the sprinklers or other water delivery units.

Relative to the modification subsystem at 23, ground moisture sensor 18 and 19 will comprise simply probes that will be placed in the soil and deposed a given distance apart. These probes 18 and 19 have respective leads 18A and 19A, which lead to the input terminals to GMS soil adjustment unit 20, the term "GMS" being used to designate "ground moisture sensor." The GMS soil adjustment 20 may comprise simply a variable resistor as shown in FIG. 2 at the dotted block designated by the numeral 20.

Figure 2:
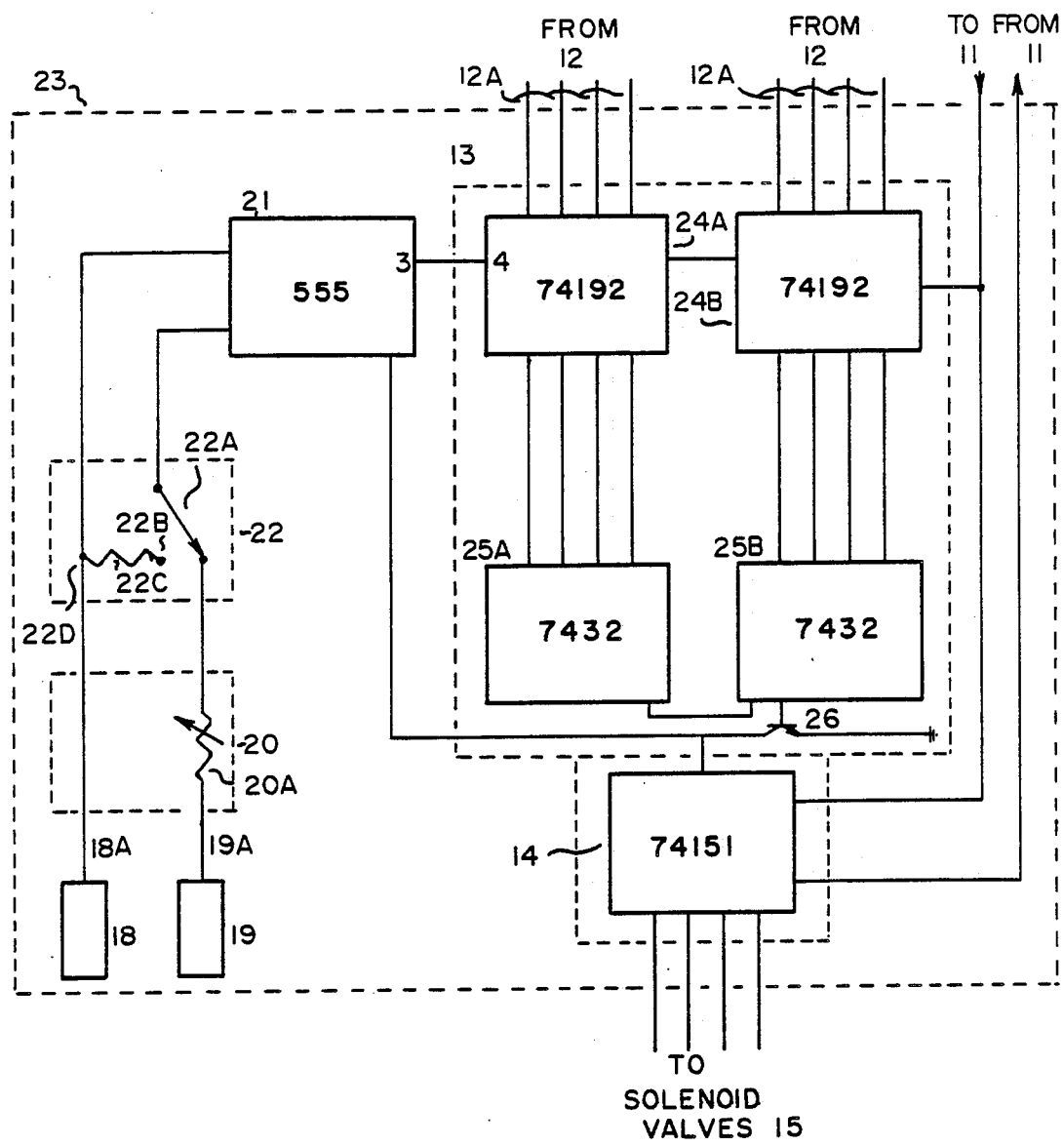
FIG. 2 is an electrical schematic, principally in block diagram form, of the modification subsystem present in the invention and shown within the dotted line configurement in FIG. 1.

GMS bypass at 22 in FIG. 1 is shown in the dotted block designated by 22 in FIG. 2 and simply comprises a switch 22A, which has one contact leading to variable resistor 20A and another contact 22B connected to resistor 22C. The latter is connected at junction 22D to lead 18A shown in both FIGS. 1 and 2. Frequency clock 21 in FIG. 1 is also shown in FIG. 2 and is given the designation "555", which is likewise standard in the industry for the designation of frequency clocks that are manufactured by a number of different companies.

The output terminal at 3 of clock 21 is connected to input terminal 4 of unit 24A. Units 24A and 24B are standard IC chips known in the industry by manufacturer part number 74192, manufactured by several companies. Correspondingly, IC chips 7432 are designated by 25A and 25B in FIG. 2 and likewise are manufactured by several companies. The four IC chips designated are part of countdown timer 13, illustrated in a dotted line block in FIG. 2 an also by a solid line block 13 in FIG. 1. The input of the countdown timer at 13B is connected by lead 13C to lead 11B in the manner indicated. Valve selector 14 shown in both FIGS. 1 and 2 is a standard valve selector known in the industry as 74151 and manufactured by many companies. The valve selector 14 is simply another IC chip. Transistor 26 is employed, is grounded as indicated and connects to chips 14 and 21 in the manner shown, the base being connected to chip 25B in FIG. 2. The purpose of transistor 24, shown as an NPN transistor, is for the purpose of shutting off frequency clock 21 at the end of the preset time as set by the preset time memory 12.

IN OPERATION

In operation, clock 10 again is an off-the-shelf item, and clocks of the type contemplated can be adjusted for days, hours and general times of usage.

In a conventional system we have the clock 10, sequencer 11, and preset time memory 12 present and being connected directly to the solenoid valves at 15. The clock is preset to the starting time in the cycle. The sequencer 11 will select each station by choosing the preset times available at preset time memory 12. It is the output circuits of these preset time memories, in the conventional system which directly control the solenoid valves at 15. In the present convention, however, there is interposed, between the usual preset time memory 12 and the solenoid valves 15, the modification subsystem at 23 as shown in the dotted line block indicated in FIG. 1. Specifically, the sensors 18 and 19 being disposed a preset distance in the ground, to be watered, are coupled via unit 20 and 22 to frequency clock 21. This is to say, the variable resistor in GMS soil adjustment 20 is used to adjust for different soil types that may be present, i.e. sandy soil, clay soil, differing pH factor, and so forth. The GMS bypass 22 in FIGS. 1 and 2, with the switch arm 22A in the condition shown in FIG. 2, will be responsive to electrical resistance and hence moisture content of the soil between the two probes 18 and 19. Where the switch arm at 22A is switched over to break the circuit to probe 19 and contact the terminal of resistor 22C, then the probes are effectively switched out of the circuit and instead the preset time memory 12 will be employed. For the automatic adjustment feature the present invention, however, the switch will be in the condition shown at 22A in FIG. 2.

At this point we arrive at the function of frequency clock 21. The frequency clock 21 at its input side 21A senses the overall resistance at this side of the circuit and determines the rate or frequency of the clock 21 in controlling countdown timer 13. Accordingly, the greater resistance to the left of terminal 21A as is sensed by the frequency clock the more dry the soil and hence the longer time will be desired for the watering function.

The countdown timer operates as follows:

Let us assume that the countdown timer will countdown, initially, at one pulse per minute from the frequency clock. If the soil is drier than normal and the resistance increases at probes 18 and 19, then the frequency clock will be caused to count at a slower rate such that the pulse is received on the input side of countdown timer would be time-spaced more widely apart. Thus, as to the preset time memory 12, a longer period of actual time would be required for the countdown timer to reach zero. The IC chips 24A and 24B are binary so that it takes other lines coming in, i.e. at 12A, to control one digit at chip 24A. Likewise, four lines will be required for chip 24B in FIG. 2. Accordingly, countdown timer 13 is a two-digit operating circuit. In the situation where there is excess moisture in the soil, than the resistance is less, clock 21 speeds up, the time delay between successive pulses at the input side of countdown timer 13 is less and the preset time memory would count down at a more rapid rate leading to countdown timer 13, reaching zero sooner. The operation is sensed by the valve selector 14 which in turn controls the solenoid valves 15. It is noted that the sequencer 11 chooses the preset time and also selects the particular valve to be actuated. The sequencer controls the preset time to be loaded into the countdown timer as at station 1, 2, 3, or 4, and also controls the corresponding valve that is selected to match the preset time. Accordingly, in this system there will be only one sprinkler branch on at a time and that particular time and also the branch selected is determined by the sequencer in combination with the time memory 12 and countdown timer 13 as modified by the modification circuit to the left of frequency clock 21.

The end result is that there may be provided a series of sprinkler locations having their respective solenoid valves and branch lines as indicated at 15 and 17, this with a common water input at 16.

In installation, the user will preset and leave permanently the ground moisture sensors, i.e. probes 18 and 19 in a particular area where average moisture content is to be anticipated. Then, he will set up his sprinkler system such that that area containing the probes will be watered last, this so that prior waterings will not affect the soil moisture condition where the probes are located. Accordingly, the remaining areas are watered first, and in sequence, before the last area containing the probes is watered. As an option within the frequency clock 21 is a means of locking in the countdown frequency, as given by probes 18 and 19 at the start of the watering cycle. This provides a means of keeping the percentage of modification to each watering station constant throughout the watering cycle. Thus, only one modification subsystem is needed at 23 regardless of how many irrigation branches are present in the entire system. Again, the sequencer selects the branch to be watered and the appropriate valve. Assume that a first sprinkler branch is set for 30 minutes of watering time, a second branch for 60 minutes, a third branch for 15 minutes. These times will be preset at unit 12. Now, with the present system, with the modification subsystem added, then in a particularly wet time of the year where a fifty percent reduction in water delivery is selected, then each station time will be reduced by fifty percent. Accordingly, there is only one modification subsystem 23 that is needed regardless of the extent or number of the individual branches that are sequenced by the sequencer and time memory at 11 and 12. Accordingly, what is presented is a new and useful water delivery system which is adjusted according to average soil moisture content so as to override preset times of the irrigation system to produce increases or decreases, of standard percentage, relative to all of the irrigation branches presented.

OPERATING EVENTS AND SEQUENCE

1. The clock 10 reaches the start time.
2. The preset time which is held in the memory 12 is loaded into the countdown timer 13.
3. An electric solenoid 15 is activated, turning on the water supply 16.
4. The countdown timer 13 counts down at a rate supplied by the frequency clock 21.
5. The frequency of the clock is determined by the resistance of the ground moisture sensors 18 and 19 and the resistor 20 in series with it.
6. When the time entered into the countdown counter 13 reaches 0 the electric solenoid 15 is shut off, turning off the water supply 16.
7. It then advances through all remaining stations, using the same countdown counter 13, frequency clock, and ground moisture sensors 18 and 19.
8. The ground moisture sensors 18 and 19 are placed in the area of the last station, so that the countdown frequency will remain constant throughout the watering sequence.
9. A switch 22A (FIG. 2) is used to bypass the ground moisture sensors 18 and 19 so that the preset time will equal the watering time, when this condition is desired.
10. The resistor 22C (FIG. 2) in series with the ground moisture sensors is a variable resistor that can be adjusted for the different types of soil, which have different resistances at the same moisture level. Countdown rate, as used herein, is the rate provided from the frequency clock 21. Its rate is in the form of pulses per minute, and is controlled by the ground moisture sensors 18 and 19. The countdown rate is supplied to the countdown timer 13 and controls the rate at which the input from memory 12 is counted down.

Therefore, while particular embodiments of the present invention have been shown and described, it will be obvious to those skilled in the art that changes and modifications may be made without departing from this invention in its broader aspects, and, therefore, the aim in the appended claims is to cover all such changes and modifications in the claims which follow.

I claim:

1. In combination, a water delivery system having a series of branches, first means for controlling said water delivery system to sequence the operation of said branches and to time the operating times of said branches, and second means coupled to said first means, and including a pair of mutually spaced probes, for modifying and locking in, prior to water delivery start-ups, any preset water delivery timing, thereby so modifying water delivery, by increasing and decreasing the same, in accordance with ambient soil conditions.

2. An electronically controlled watering system having a count down timer and also watering means at a series of watering stations thereof, and ground moisture sensor means coupled to said watering means whereby to operate as a resistor for controlling countdown rate of said count down timer of said system, thereby permitting the employment of said ground moisture sensor means to vary water delivery at a preselected number of said watering stations.

* * * * *